United States Patent Office.

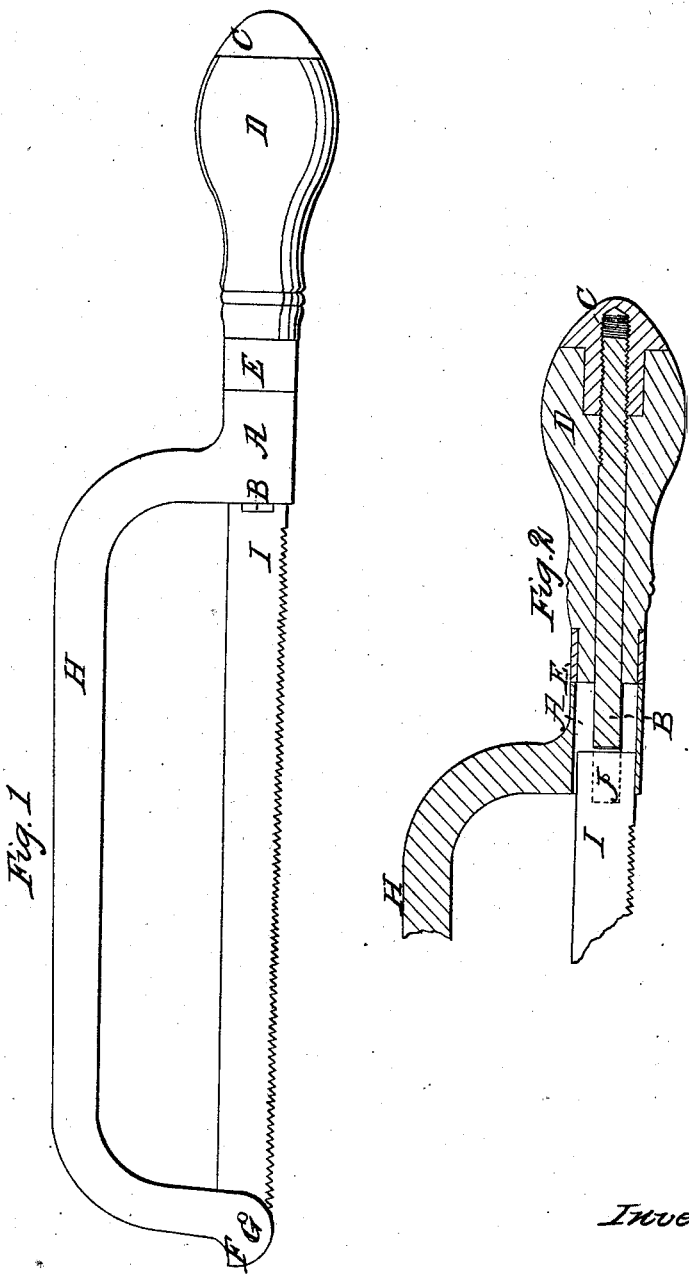

ALPHEUS W. ELMER, OF SPRINGFIELD, MASSACHUSETTS, ASSIGNOR TO HIMSELF AND CHRISTIAN ENSMINGER, OF SAME PLACE.

Letters Patent No. 66,690, dated July 16, 1867.

IMPROVEMENT IN HAND-SAWS.

The Schedule referred to in these Letters Patent and making part of the same.

TO ALL WHOM IT MAY CONCERN:

Be it known that I, A. W. ELMER, of Springfield, in the county of Hampden, and State of Massachusetts, have invented a new and useful Improvement in Saw-Frames; and I do hereby declare that the following is a full and exact description thereof, reference being had to the accompanying drawings, and to the letters of reference marked thereon. In the drawings—

Figure 1 is a side elevation, and

Figure 2 is a longitudinal section of my invention.

This invention consists in constructing a frame no longer than is necessary to take in the saw, and taking it up by means of a nut in the handle.

To construct this, I make a bow or frame of iron or other suitable metal, with the socket A on the end, on which I place the handle. (See fig. 1.) I then drill a hole through the centre of it, to receive the shank B, (see fig. 2;) after which I slit the socket A through the centre perpendicularly, to receive the saw I. One end of the shank B I slit far enough to take in the end of the saw I, which I secure with the pin J. On the other end I cut a screw, which goes into and is taken up by the nut C. This nut is made with an oval head, forming a part of the handle D. The inner end is a quill, fitted to the counter-bore in the handle, and held from turning by friction. The handle, which is made of wood, is bored entirely through, to receive the shank B, and is protected on the end that bears on the socket A with the ferrule E. The end of the frame, at F, is slit to receive the saw I, which I fasten with the pin G. I also carry the end of the frame out at F, thus forming a seat for the finger to bear down on while using. To put it together, I put the nut C into its place in the handle D. I then insert the shank B into the handle D, and start it into the nut C. I then secure the saw to the shank by means of the pin J. I then drop the saw back first into the slit in the socket A, enter the shank into the hole, and slide it forward into the end of the frame at F, and secure it with the pin G. To take it up, I turn the handle D and nut C together, the nut being held by friction, as before mentioned. I make the bow H in any of the known forms, of iron or steel or other suitable material. The handle I make of wood; the nut and ferrule I make of brass or other suitable metal; and also the shank and pins I make of iron or steel.

The advantages of this invention are: It makes a more compact frame than any now in use, is cheaper and easier made, and takes up less room for the length of the saw. Its uses: it is designed for an improvement on machinists', jewellers', and surgeons' saw-frames, and may be adapted to almost any other.

Now, having described my invention and its uses, I will now proceed to the claim.

I do not claim the general form of the bow, as it is made and used in a similar form. Disclaiming the separate parts as are anticipated in Patents 48,376 and 52,131, I claim as my invention—

The combination of the nut C, in the end of and forming a part of the handle D, with the slit socket A; the round hole to receive the shank B, and the shank B, with the end split to receive and hold the saw, substantially as set forth and described.

A. W. ELMER.

Witnesses:
HENRY W. BOSWORTH,
C. H. ORCUTT.